US011867141B1

(12) United States Patent
Krenus

(10) Patent No.: US 11,867,141 B1
(45) Date of Patent: Jan. 9, 2024

(54) ETHANOL DETECTION WITH HEATED FUEL INJECTOR IN FLEXIBLE FUEL VEHICLES

(71) Applicant: DELPHI TECHNOLOGIES IP LIMITED, St. Michael (BB)

(72) Inventor: Roberto Gothardo Krenus, Piracicaba (BR)

(73) Assignee: DELPHI TECHNOLOGIES IP LIMITED, St. Michael (BB)

( * ) Notice: Subject to any disclaimer, the term of this patent is extended or adjusted under 35 U.S.C. 154(b) by 0 days.

(21) Appl. No.: 18/119,395

(22) Filed: Mar. 9, 2023

(51) Int. Cl.
*F02D 19/06* (2006.01)
*F02M 53/06* (2006.01)
*F02M 31/125* (2006.01)

(52) U.S. Cl.
CPC ......... *F02M 53/06* (2013.01); *F02D 19/0605* (2013.01); *F02D 19/0655* (2013.01); *F02M 31/125* (2013.01); *F02D 2200/0612* (2013.01)

(58) Field of Classification Search
CPC ............. F02D 19/0605; F02D 19/0655; F02D 19/0649; F02D 19/085; F02D 19/087; F02M 53/06; F02M 53/04
See application file for complete search history.

(56) References Cited

U.S. PATENT DOCUMENTS 7,766,254 B2 8/2010 Trapasso et al.
9,587,604 B2 3/2017 Kabasin et al.
2006/0243248 A1* 11/2006 Kawanishi ............. G01N 25/18 123/406.12
2010/0078507 A1 4/2010 Short
2011/0276252 A1* 11/2011 Kabasin ................. F02M 53/06 374/141

(Continued)

FOREIGN PATENT DOCUMENTS

CN 105556105 B * 12/2017 ......... F02D 19/0605
CN 209656487 U * 11/2019

OTHER PUBLICATIONS

De Oliveira Jr. et al., "Ethanol Sensor using the Critical Heat Flux (CHF) Principle," SAE Technical Paper Series 2011-36-0115, SAE Brasil 2011 Congress and Exhibition (2011).

*Primary Examiner* — George C Jin
*Assistant Examiner* — Teuta B Holbrook
(74) *Attorney, Agent, or Firm* — Warner Norcross + Judd LLP

(57) ABSTRACT

A method of detecting a percentage of ethanol in fuel used by an engine is provided. The method includes obtaining the heater temperature at a first time $t_1$ at which a slope of the heater temperature as a function of time reaches a predetermined threshold value indicative of fuel boiling; obtaining the heater temperature at a subsequent time $t_2$ at which the slope of the heater temperature approaches a value of the slope prior to the time $t_1$ and which is greater than the predetermined threshold value; and determining the percentage of ethanol in the fuel as a function of the first time $t_1$ and a calculated temperature difference $\Delta T$ between the heater temperature at time $t_2$ and the heater temperature at the first time $t_1$. A fuel delivery system that detects a percentage of ethanol in fuel by the method, and a flexible fuel vehicle including the fuel delivery system, are also provided.

18 Claims, 11 Drawing Sheets

(56) References Cited

U.S. PATENT DOCUMENTS

| | | | | |
|---|---|---|---|---|
| 2012/0226427 | A1* | 9/2012 | Kemmer | F02D 41/0025 701/103 |
| 2018/0073682 | A1* | 3/2018 | Suman | G08C 17/02 |

* cited by examiner

ETHANOL DETECTION WITH HEATED FUEL INJECTOR IN FLEXIBLE FUEL VEHICLES

FIELD OF THE INVENTION

The disclosure generally relates to the detection of ethanol in engine fuel and, more specifically, to the determination of the ethanol content of fuel with a heated component of an automotive engine fuel delivery system.

BACKGROUND OF THE INVENTION

Flexible fuel vehicles (FFV's, which may also be referred to as flex-fuel, dual-fuel, total flex, flexifuel, hi-flex, or simply flex vehicles) are vehicles having an internal combustion engine that is capable of operation using both conventional vehicular fuel (e.g., unleaded gasoline) and an alternative fuel such as ethanol or methanol which are stored in the same fuel tank of the vehicle. The most common type of flexible fuel vehicle has an engine that can run on gasoline, gasoline-ethanol blends (e.g., E10, E20, E85), and/or pure ethanol (E100). E85, also known as flex fuel, is a gasoline-ethanol blend that includes up to 85% by volume anhydrous ethanol and in practice may contain between 51% to 85% anhydrous ethanol depending on the geographical region and seasonal temperatures. Other common gasoline-ethanol blends include E10 (containing a maximum of 10% anhydrous ethanol), E20 (containing a maximum of 20% anhydrous ethanol), E25 (containing a maximum of 25% anhydrous ethanol), E70 (containing a maximum of 70% anhydrous ethanol), and E75 (containing a maximum of 75% anhydrous ethanol). Pure ethanol (E100) contains no gasoline and is 100% hydrous ethanol, which contains an average of 5.3% by volume water and the balance ethanol. Due to its inherent water content, pure ethanol is sometimes referred to as E95.

The type/blend of fuel used in a flexible fuel vehicle can be varied based on the user's preference and availability of the various blends described above. For example, a user may fill the fuel tank of a flexible fuel vehicle with gasoline, and later when the tank is empty and/or in need of refilling, may instead next fill the tank with E85 fuel. The user thus may freely switch between gasoline (which in its pure form contains no ethanol, but as presently sold at the gas pump in the United States, may contain up to 10% ethanol) and E85, which is more than half ethanol. As shown by example in FIG. 1, upon a refill of a fuel tank in which fuel was changed from a low-ethanol blend to a high-ethanol blend, at engine idle it takes approximately 400 seconds to purge the old (original) fuel from the fuel lines of the vehicle's fuel delivery system and for the vehicle's onboard control module to complete the learning of the ethanol content of the new fuel. Therefore, for some flexible fuel vehicles, it is recommended to drive the vehicle a minimum of 4 miles (approximately 11 kilometers) after refueling to assure the vehicle's computer has sufficient time to learn the ethanol content present in the fuel tank and make any necessary operational adjustments. If the flexible fuel vehicle is not given sufficient time to learn the ethanol content when there is a change between use of gasoline and use of ethanol or ethanol blends, the user may encounter engine ignition issues upon the next cold start following refueling. Hence, this period following a refueling event in which there is a switch between use of gasoline and ethanol/ethanol-blends is a weak spot in the ethanol learning conducted by the vehicle's computer system. Particularly, in a spark-ignited engine fueled by gasoline, ignition of the fuel/air mixture readily occurs except at extremely low temperatures (i.e. below −40° C.) because of the relatively low flash point of gasoline. (The term "flash point" of a fuel is defined herein as the lowest temperature at which the fuel can form an ignitable mixture in air). However, in a spark-ignited engine fueled by alcohol-based fuels such as ethanol (E100) or mixtures of ethanol and gasoline (e.g., E85) having a much higher flash point, ignition of the fuel/air charge may not occur in cooler climate conditions. For example, ethanol has a flashpoint of about 12.8° C. Thus, starting a spark-ignited engine fueled by ethanol can be difficult or impossible under cold ambient temperature conditions experienced seasonally in many parts of the world, and can be exacerbated by the engine's computer not recognizing a change in fuel type.

Conventionally, the ethanol content of the fuel stored in the vehicle's fuel tank is detected and measured using an ethanol sensor located at the fuel line or by the oxygen (02) sensor located in the engine's exhaust system. The ethanol content may also be measured indirectly in other ways, such as by measuring the electrical capacitance of the fuel. However, given the significant lag time in a vehicle learning the ethanol content of fuel by conventional methods (for example, the oxygen sensor measures the mixture after burn) and the potential undesirable effects of this lag time, there is a need for an alternative method of determining the ethanol content of fuel used in flexible fuel vehicles.

BRIEF SUMMARY

A method of detecting a percentage of ethanol in fuel used by an engine is provided. The method includes initiating a heating cycle in a component of a fuel delivery system of the engine, the component including a heater. The method further includes monitoring the temperature of the heater as a function of time, the heater being operated during the heating cycle. The method further includes obtaining the heater temperature at a first time $t_1$ at which a slope of the heater temperature as a function of time reaches a predetermined threshold value indicative of fuel boiling. The method further includes obtaining the heater temperature at a subsequent time $t_2$ at which the slope of the heater temperature approaches a value of the slope prior to the time $t_1$ and which is greater than the predetermined threshold value indicative of fuel boiling. The method further includes calculating a difference $\Delta T$ between the heater temperature at time $t_2$ and the heater temperature at the first time $t_1$. The method further includes determining the percentage of ethanol in the fuel as a function of the calculated temperature difference $\Delta T$ and the first time $t_1$.

In specific embodiments, the heating cycle is initiated prior to ignition of the engine.

In specific embodiments, the heating cycle is initiated after a refueling event.

In specific embodiments, the component is a heated fuel injector.

In particular embodiments, the heater heats a body of the heated fuel injector.

A method of detecting a percentage of ethanol in fuel used to operate an engine of a flexible fuel vehicle is also provided. The method includes initiating a heating cycle in a heated fuel injector of the engine, the heated fuel injector including a heater that is operated during the heating cycle. The method further includes monitoring the temperature of the heater of the heated fuel injector as a function of time. The method further includes obtaining the heater temperature at a first time $t_1$ at which a slope of the heater temperature as a function of time reaches a predetermined threshold value indicative of fuel boiling. The method further includes obtaining the heater temperature at a subsequent time $t_2$ at which the slope of the heater temperature approaches a value of the slope prior to the time $t_1$ and which is greater than the predetermined threshold value indicative of fuel boiling. The method further includes calculating a difference ΔT between the heater temperature at time $t_2$ and the heater temperature at the first time $t_1$. The method further includes determining the percentage of ethanol in the fuel as a function of the calculated temperature difference ΔT and the first time $t_1$ at which there was a change in slope.

In specific embodiments, the heating cycle includes heating a body of the heated fuel injector over a period of time.

In specific embodiments, the heating cycle is initiated after adding fuel to a fuel tank of the flexible fuel vehicle.

In specific embodiments, the heating cycle is initiated prior to ignition of the engine.

In specific embodiments, duration of the heating cycle is between 5 and 10 seconds.

In specific embodiments, the percentage of ethanol is determined by the following equation (I): % ethanol in fuel=$C+\alpha t_1-\beta(\Delta T)$.

In particular embodiments, C is 49.95±2.50, α is 5.22±0.26, and β is 2.8319±0.1416.

In particular embodiments, the numerical values of the formula are determined based on an empirical linear regression using experimental data points obtained from known ethanol concentrations of fuel.

In specific embodiments, a margin of error of the determined percentage of ethanol in the fuel is ±15%.

In specific embodiments, the steps of the method are performed by a fuel heater control module of the flexible fuel vehicle.

A fuel delivery system of an engine is also provided. The fuel delivery system includes a heated fuel injector including a heater and a body that is heated by the heater. The system further includes a fuel tank that stores fuel, and a fuel module that delivers the fuel from the tank to the heated fuel injector. A fuel heater control module controls the heater of the heated fuel injector. The fuel heater control module detects a percentage of ethanol in the fuel used to operate the engine by the method described herein.

A flexible fuel vehicle is also provided. The flexible fuel vehicle includes an engine and a fuel delivery system that delivers fuel to the engine. The fuel delivery system includes a heated fuel injector including a heater that heats a body. The fuel delivery system further includes a fuel heater control module that controls the heater of the heated fuel injector. The fuel heater control module detects a percentage of ethanol in fuel used to operate the engine by the method described herein.

A non-transitory computer readable medium storing a program that causes a controller to execute the method of detecting a percentage of ethanol in fuel used to operate an engine of a flexible fuel vehicle is also provided.

DESCRIPTION OF THE DRAWINGS

Various advantages and aspects of this disclosure may be understood in view of the following detailed description when considered in connection with the accompanying drawings, wherein.

DETAILED DESCRIPTION OF THE INVENTION

A method of detecting a percentage of ethanol in fuel used by an engine, as well as a fuel delivery system and a flexible fuel vehicle that detects the content of ethanol in fuel according to the method, are provided. Referring to FIGS. 2-11, wherein like numerals indicate corresponding parts throughout the several views, the method utilizes a heated component of a vehicle's fuel delivery system 20. By way of non-limiting example, the heated component is illustrated and generally designated as a heated fuel injector 22. While the heated component is illustrated as a heated fuel injector, it should be understood that the invention is not to be limited to application with a heated fuel injector, but could also be applied to other heated components such as but not limited to a heated fuel rail. The method provides a fast and accurate detection of ethanol in fuel used by the vehicle utilizing an existing heated component of the fuel delivery system 20, without the need for including any additional components that only serve the purpose of performing the method. In other words, the method only utilizes existing components of the engine's fuel delivery system. The method may also be performed prior to engine start-up, while the engine is otherwise not in operation. In contrast, existing methods of ethanol detection in fuel can only be performed while the engine is running.

Figure 1:
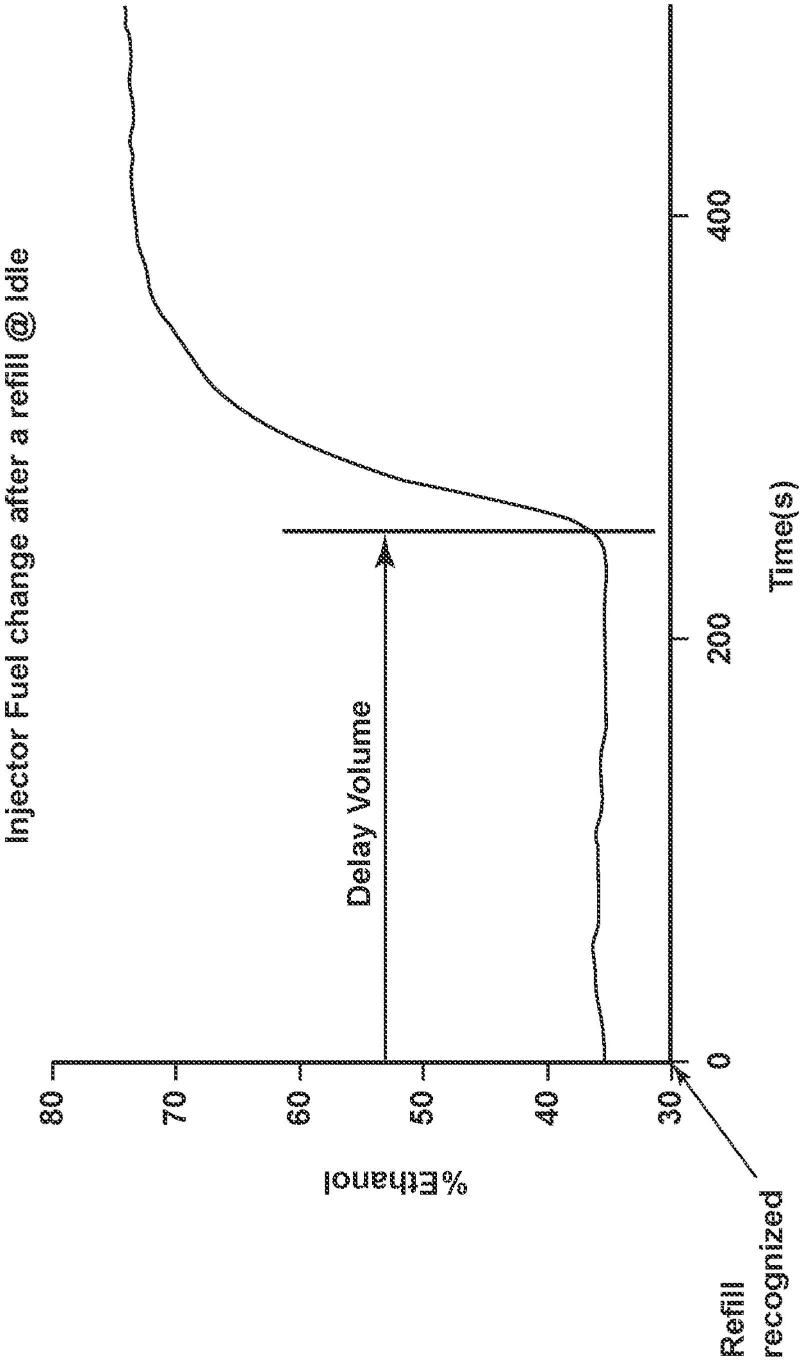
FIG. 1 is a graph of the percentage of ethanol in fuel at a fuel injector of an engine after refill of the fuel tank as a function of time at engine idle.
Figure 2:
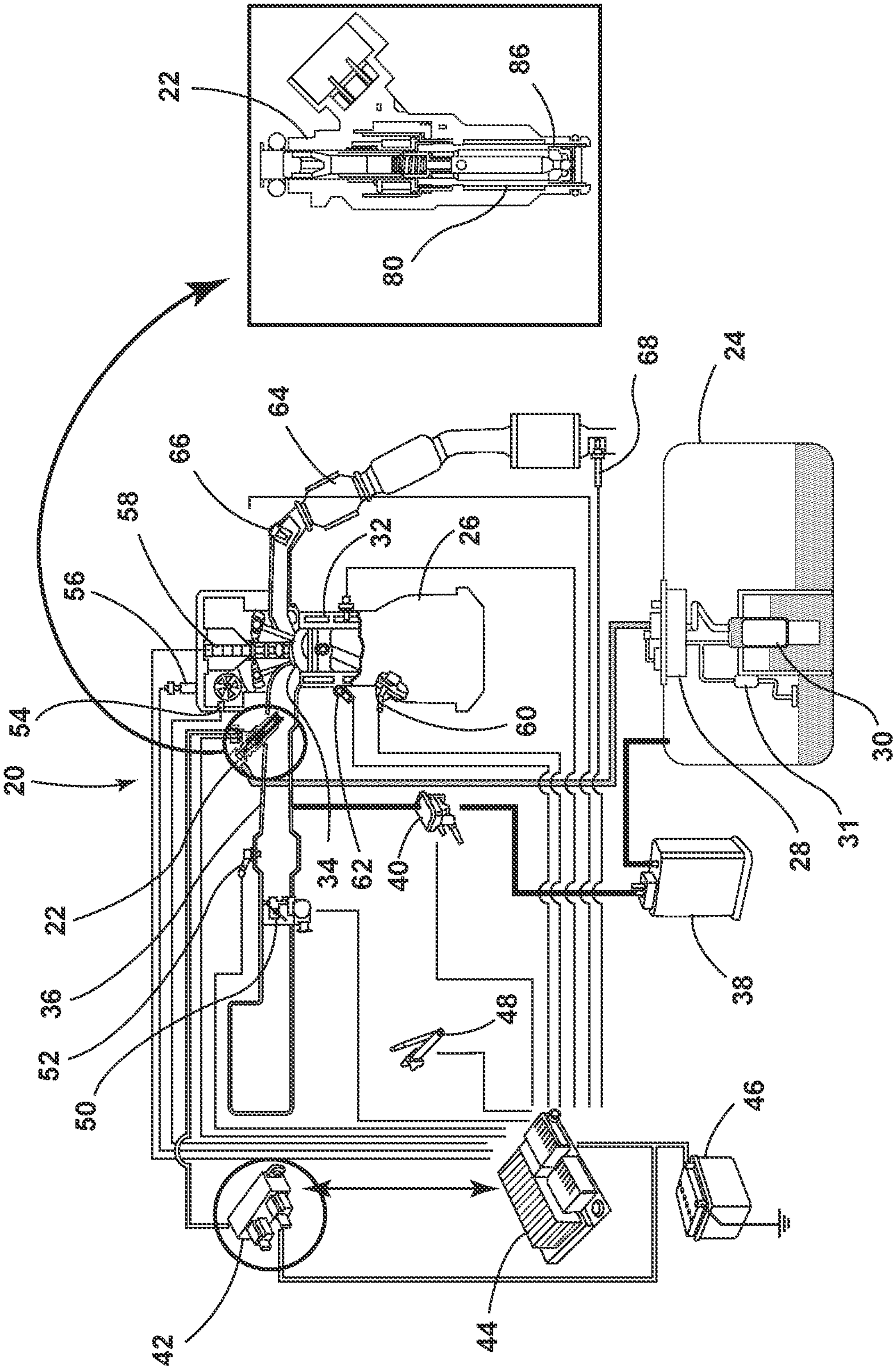
FIG. 2 is a schematic view of a fuel delivery system of an engine.

Turning first to FIG. 2, the fuel delivery system 20 includes a fuel tank 24 that stores a volume of fuel for combustion in the internal combustion engine 26 and conversion into power. The fuel may be any type of unleaded gasoline, gasoline-ethanol blend, or pure ethanol. A fuel module 28 including a fuel pump 30 provides a source of pressurized fuel that is pumped to the heated fuel injector 22. The heated fuel injector 22 may be located upstream of the engine cylinders 32, and may, for example, inject the fuel into an air intake port 34 of the vehicle's air intake manifold 36. An evaporative emissions canister 38 traps fuel vapors present in the fuel tank 24, and during operation of the engine these vapors are purged from the canister and delivered to the air intake manifold 36 by opening a canister valve 40. A fuel heater control module (FHCM) 42, in connection with an engine control module (ECM) 44, controls the heating and operation of the heater fuel injector 22. The fuel heater control module 42 and engine control module 44 are powered by a battery 46, and via other components and sensors including but not limited to a pedal position sensor 48, an engine air control valve 50, a MAT/MAP sensor 52, a Hall sensor 54, a valve timing solenoid 56, an ignition coil 58, an rpm sensor 60, and a knock sensor 62 control the delivery of fuel to and associated combustion in the engine 26. The products of combustion including carbon dioxide and water are exhausted from the engine cylinders 32 and expelled through an exhaust system 64 that includes front and rear oxygen sensors 66, 68, respectively.

Figure 3:
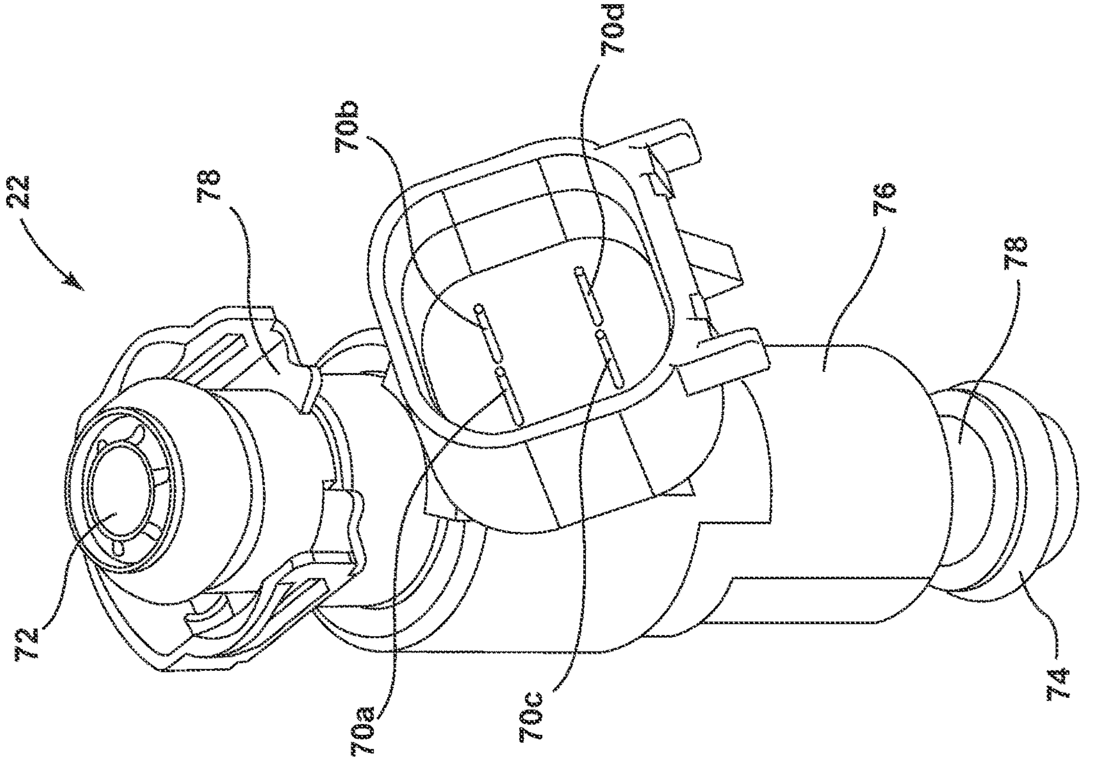
FIG. 3 is a perspective view of a heated fuel injector for use with some embodiments of the disclosure
Figure 4:
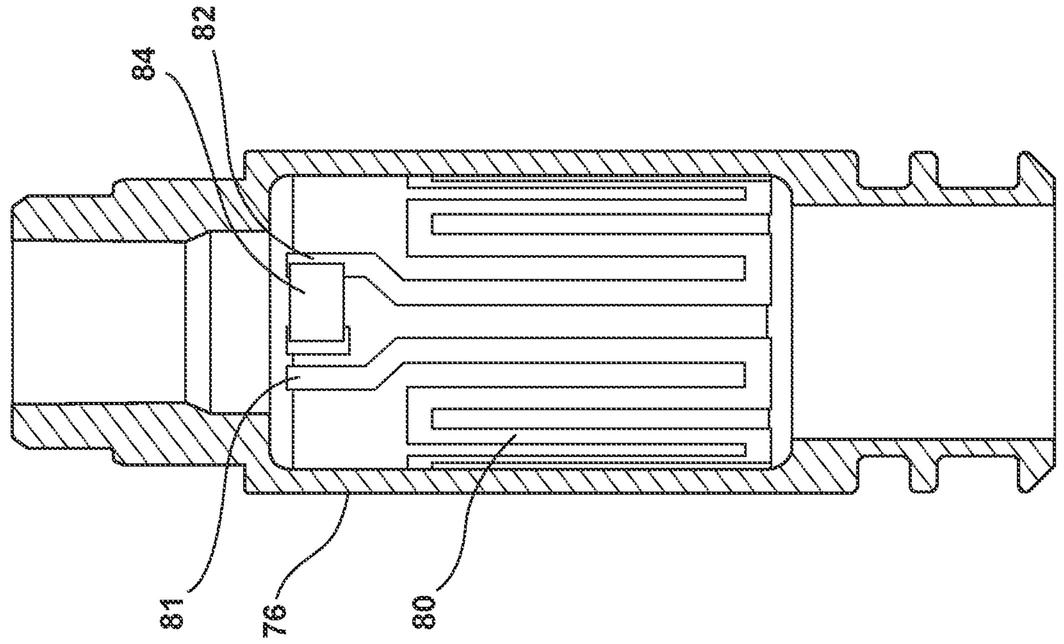
FIG. 4 is a cut-away view of part of the heated fuel injector of FIG. 3.

As shown in detail in FIGS. 3 and 4, an exemplary heated fuel injector 22 has four connector pins 70*a*, 70*b*, 70*c*, and 70*d*, a fuel inlet end 72, a fuel dispensing end 74, and a shell 76 overlying a fuel injector body 78. Typically, the heated fuel injector 22 is attached to the engine 26, the fuel inlet end 72 is coupled to the fuel module 28, and the fuel dispensing end 74 is positioned so fuel passing through the body 78 is dispensed by the heated fuel injector 22 to be utilized by the engine to operate the engine. By way of a non-limiting example, connector pins 70*a* and 70*b* may be coupled to an actuation coil within the body 78 of the heated fuel injector 22 that operates a valve also within the body 78 and generally located at the fuel dispensing end 74. Continuing with the example, if a voltage is applied across connector pins 70*a* and 70*b*, the valve may open to allow fuel to flow from the fuel inlet end 72, through the body 78, and out of the fuel dispensing end 74. When the voltage is removed or actively forced to zero volts, the valve may close and stop or obstruct the flow of fuel. By controlling the voltage applied to the connector pins 70*a* and 70*b*, the heated fuel injector 22 may be operated to controllably dispense the fuel.

FIG. 4 illustrates cut-away view of the shell 76 with the body 78 removed. A heater such as a heater element 80 formed of electrically conductive material is arranged to heat the fuel within the body 78 so that heated fuel may be dispensed by the heated fuel injector 22. The heater element 80 exhibits a heater resistance so that as electric current flows through the heater element 80 heat is generated that increases a heater temperature and thereby heats the heater element 80 and increases a fuel temperature in the body and at the tip of the injector at the injector valve. An exemplary non-limiting value of the resistance of the heater element 80 is nominally 0.3 Ohms at 20° C. When the heated fuel injector 22 is assembled, the heater element 80 is suitably thermally coupled to the body 78 to be effective to heat fuel passing through the body 78. The heater element 80 may be formed, for example, of thick-film resistive material that may be applied to the exterior of the body 78, or applied to the interior of the shell 76. Alternately, the heater element 80 may be formed of metal foil or wire that is suitably arranged to heat the fuel injector body 78 and thereby heat the fuel passing through the heated fuel injector 22. The connection points 81 and 82 on heater element 80 may be connected to the connector pins 70*c* and 70*d* by soldering or other known methods. By way of example, the heated fuel injector may be of the type described in U.S. Patent Application Pub. No. 2010/0078507 and U.S. Pat. Nos. 7,766,254 and 9,587,604, the entire contents of which are incorporated by reference herein.

The heated fuel injector 22 also includes an integral temperature sensing element or similar that is configured to determine a temperature of the injector heater element 80. In a non-limiting example, the integral temperature sensing element may be a temperature dependent electrical device such as a thermistor 84. The thermistor 84 generally exhibits a resistance value that corresponds to a thermistor temperature of the thermistor 84. The thermistor 84 may also be formed of thick film material applied using methods similar to those used to apply thick film material to form the heater element 80. The thermistor 84 may also be a discrete electrical component such as a positive temperature coefficient (PTC) or negative temperature coefficient (NTC) device attached using solder or the like. The location of the thermistor 84 shown in FIG. 4 is a non-limiting example of suitable locations. For example, the thermistor 84 when formed of thick film material may overlay the heater element 80, separated from the heater element 80 by a layer of electrically insulating material, and be sized to sense temperature over a substantial area of the heater element 80. By way of example, one such integral temperature sensing element is shown in U.S. Patent Application Pub. No. 2011/0276252, the entire contents of which is incorporated by reference herein. In other embodiments, the integral temperature sensing element may be the injector heater element 80 itself.

The fuel heater control module 42 and engine control module 44 individually or together constitute a controller. As such, the controller may include a microprocessor or other control circuitry such as an application specific integrated circuit (ASIC) as would be evident to those skilled in the art. The controller also may include memory, including random-access memory (RAM) as well as non-volatile memory, such as electrically erasable programmable read-only memory (EEPROM), masked read only memory (ROM), or flash memory for storing one or more software routines, thresholds, and captured data. The one or more software routines, including the method of detecting the ethanol content of fuel, may be executed by the microprocessor to control the engine components including the heater fuel injector 22. The controller may also include analog to digital (ND) convertor circuits and digital to analog (D/A) convertor circuits to allow the convertor to establish electrical communication with devices outside the controller, such as the sensors described above. The controller may also include power supply circuitry.

Figure 5:
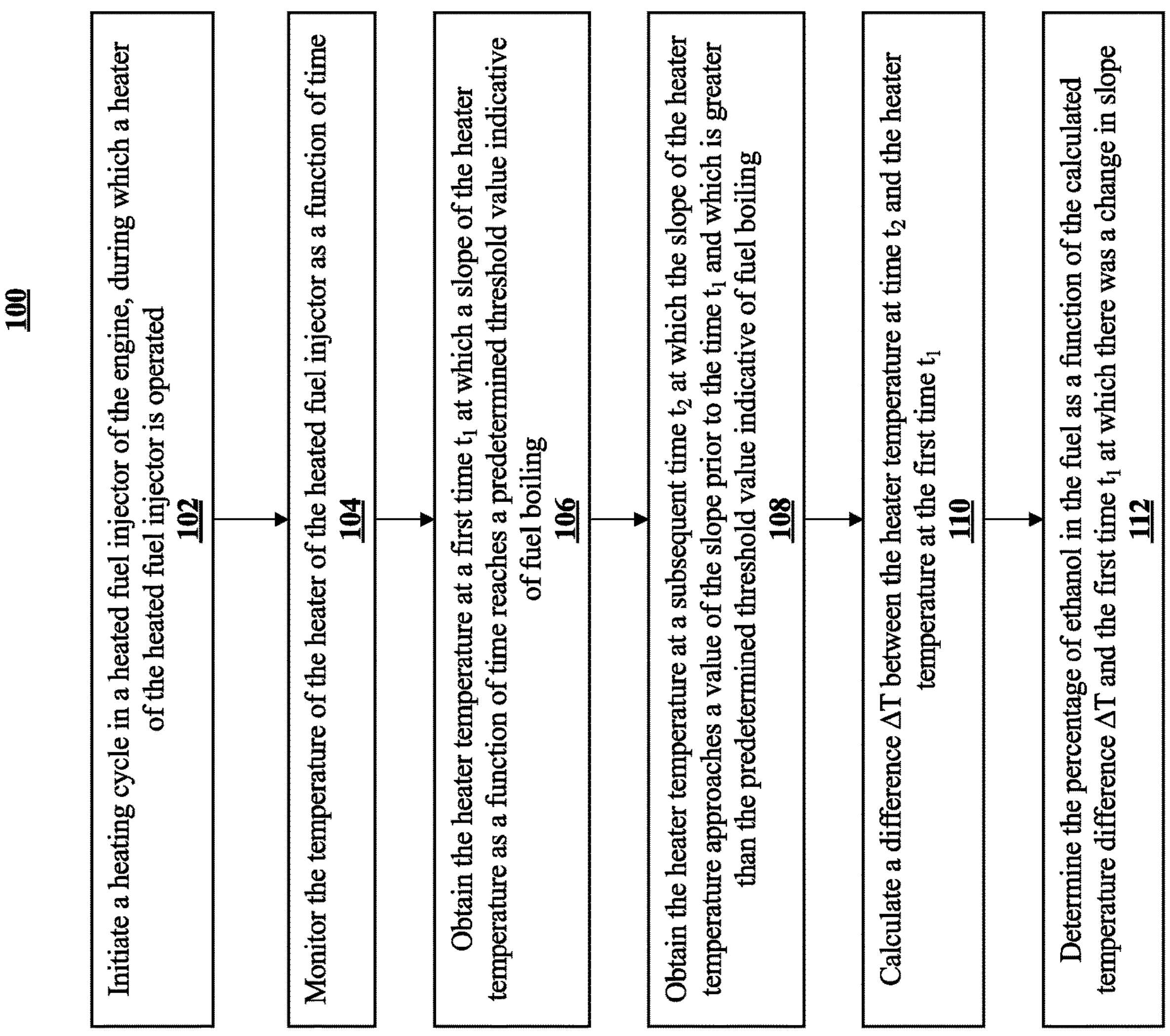
FIG. 5 is a flow diagram of a method of detecting a percentage of ethanol in fuel used by an engine in accordance with some embodiments of the disclosure.

FIG. 5 illustrates a non-limiting example of a method 100 of detecting the ethanol content of fuel used by a flexible-fuel-injected internal combustion engine. The method 100 utilizes the heated fuel injector 22 that is equipped with the heater element 80 that is configured to heat the fuel within the heated fuel injector 22 and with the temperature sensing element 84 that is capable of indicating a heater temperature. The heated fuel injector 22 is controlled by the controller that is configured to execute the steps of the method 100.

In step 102, a heating cycle is initiated in the heated fuel injector 22. The heating cycle includes operating the heater element 80 by supplying an electric current to the heater element 80, which causes the heater element 80 to generate heat and generally increase in temperature. Warming of the heater element 80 heats the body 78 of the heated fuel injector 22 which in turn raises the temperature of the fuel in the injector body 78 adjacent a tip portion 86. The heating cycle may be initiated at any time but preferably after a refueling event in which the controller detects that fuel has been added to the fuel tank 24, such as via a fuel level sensor 31 of the fuel module 28 in the fuel tank. Alternatively or in addition, the heating cycle may be initiated prior to ignition of the engine 26, e.g. just before start-up of the engine, for example triggered by the opening of the driver-side door, so that the ethanol content of the fuel may be determined prior to ignition with no start-up delay for the driver/operator so that engine operation parameters may be properly adjusted by the controller based on the determined ethanol content. As used herein, engine start-up is the time period from an initial or priming injection event until the engine speed reaches a predetermined engine speed threshold, usually an engine idle speed typically between 600 and 1000 revolutions per minute (RPM). Furthermore, a heating cycle also may be initiated at any time during engine operation to periodically measure the fuel ethanol content. The duration of the heating cycle itself is long enough to raise the temperature of the heater element 80 above the boiling temperature of at least one component of the fuel, for example the boiling temperature of ethanol which is 79° C., and for vaporization of the fuel to begin. In some embodiments, the heating cycle duration is between 3 and 10 seconds. In other embodiments, the heating cycle duration is between 5 and 10 seconds, 3 and 7 seconds, or 5 and 7 seconds.

In step 104, during the heating cycle the temperature of the heater element 80 of the heated fuel injector 22 is monitored as a function of time, such as a function of the elapsed time of the heating cycle. The temperature of the heater element 80 may be obtained from the temperature sensing element 84 and may be temporarily recorded in the memory of the controller as a function of the heating cycle time. The temperature of the heater element 80 will continue to rise until vaporization (boiling) of the fuel in the heated fuel injector begins to occur. Table 1 below shows that the specific heats of gasoline and ethanol are similar. Therefore, the initial heating phase before boiling cannot easily discriminate different fuel compositions. The heats of vaporization and boiling points, however, are quite different, which is useful for distinguishing between various fuel compositions. Pure ethanol boils at 79° C., and shows a temperature plateau while vaporization occurs, since heat energy at boiling is used to vaporize the liquid instead of heating it further. On the other hand, the many components of gasoline boil over a range of 25° C. to 175° C. They do not show the expected vaporization plateau, since they have many tiny plateaus which give the overall appearance of continuity across the temperature range of interest. But fuels with significant amounts of ethanol begin to show features of the behavior of pure ethanol, with the pure-substance behavior growing progressively more dominant as ethanol content increases.

TABLE 1

Comparison of ethanol and gasoline physical properties

| | Ethanol | Gasoline |
|---|---|---|
| Heat of Evap kj/kg | 850 | 418 |
| Density @ 20 C. kg/l | 0.79 | 0.71-0.77 |
| Heat capacity j/kg-K | 2440 | 2220 |
| molar weight g/mol | 46.07 | 114.23 |
| Boiling Temp (Deg C.) | 79 | 25-175 |

Figure 6:
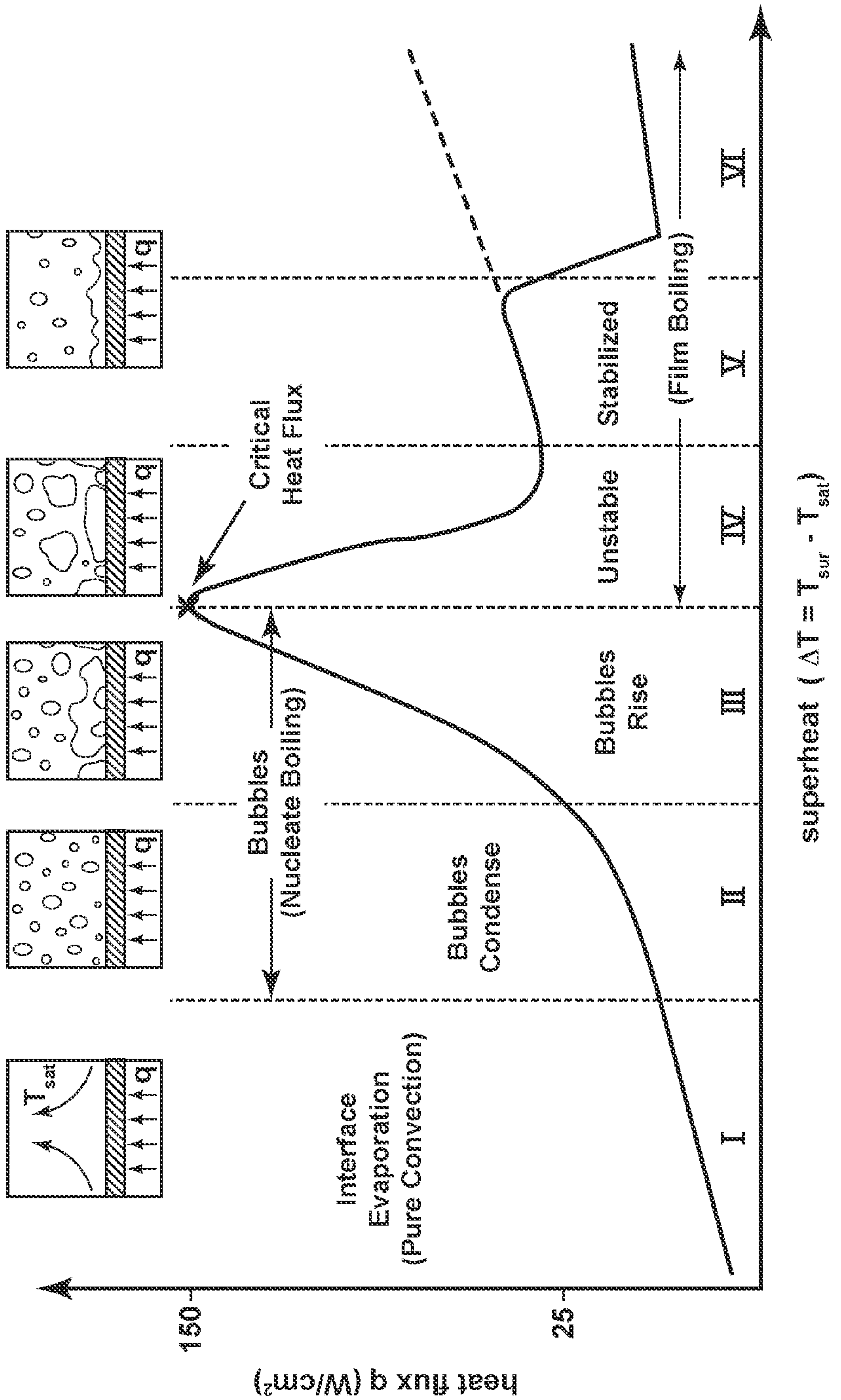
FIG. 6 is a graphical illustration of heat transfer through a heater surface to fuel as a function of superheat.

The heater element 80 temperature responds to heat transfer factors, for example the formation and persistence of fuel vapor bubbles on the heater surface, a factor that does not affect the bulk fuel temperature. FIG. 6 shows the different phases of heater transfer as a function of superheat ($T_{heater}-T_{fuel}$) to a pure liquid.

The bulk fuel experiences a temperature rise based on its specific heat capacity until the phase transition to vapor begins. Since vaporization is endothermic, the temperature of the fuel will not rise further until all the fuel is vaporized.

Figure 7:
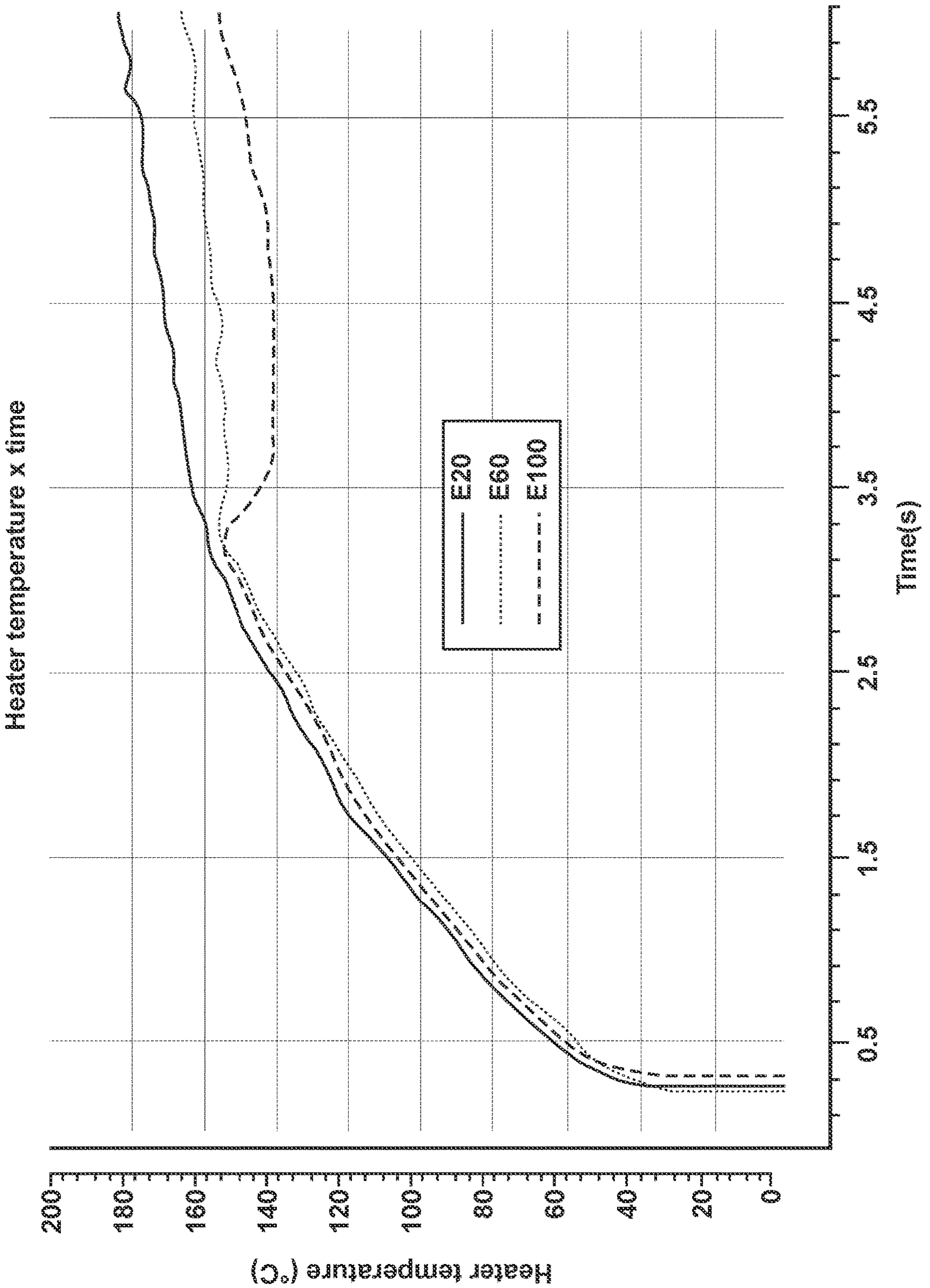
FIG. 7 is a graph of heater temperature as a function of time for various ethanol fuel types.
Figure 8:
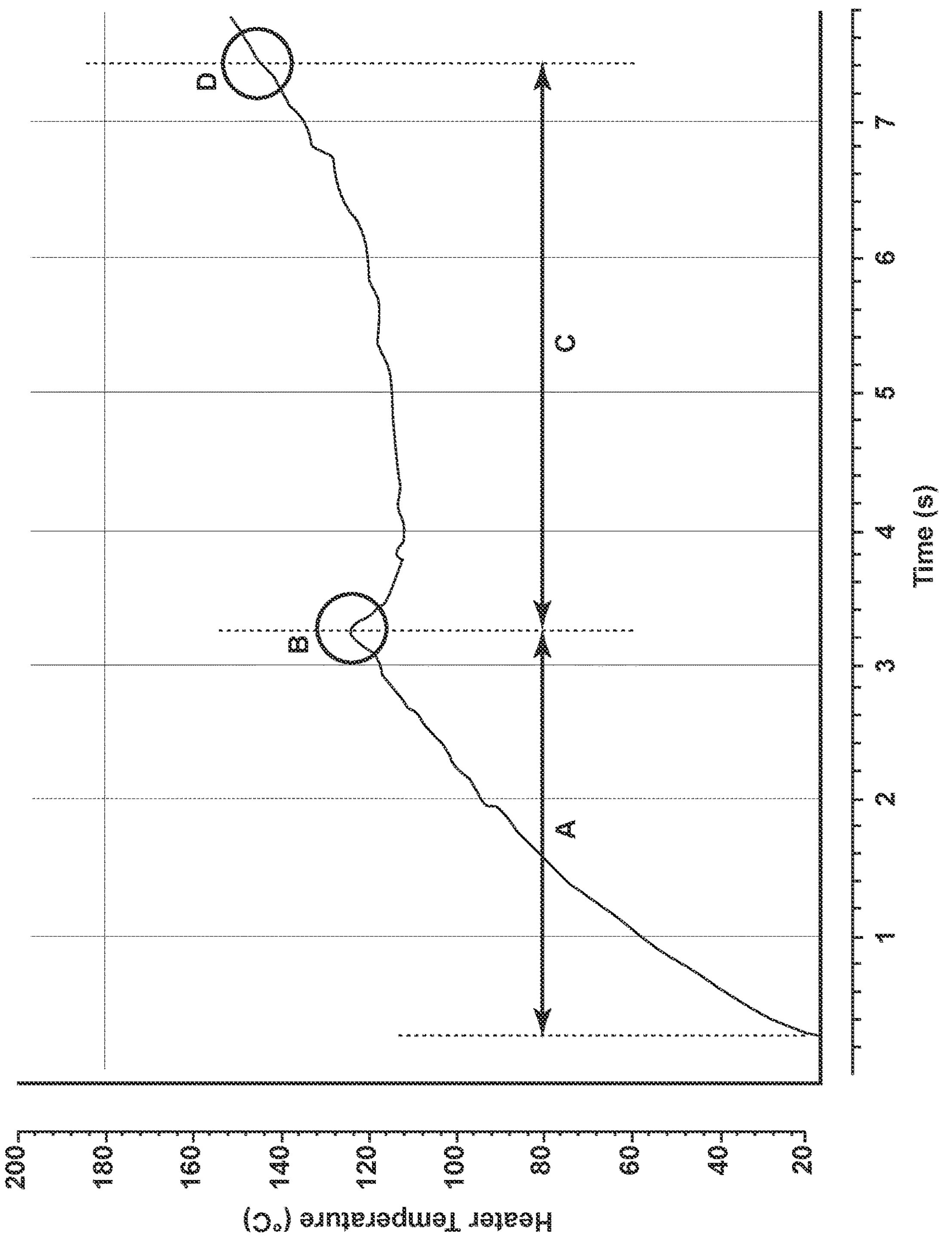
FIG. 8 is a graph of a heating cycle of a heated fuel injector in accordance with some embodiments of the disclosure.

Thus, in the bulk fuel a temperature rise is followed by a temperature plateau, followed by the resumption of temperature rise. The behavior of the monitored heater temperature generally follows this pattern. FIG. 7 shows the ethanol content dependence on the temperature profile for E20, E60, and E100 fuels. E100 is hydrous ethanol, while E20 and E60 are mixtures of ethanol and gasoline (having 20% and 60% ethanol by volume, respectively). The behavior of E20 and E60 is intermediate that of straight gasoline and pure ethanol, depending on the ethanol content. Gasoline is already a mixture of constituents with a range of boiling points. Therefore, the more gasoline and the less ethanol a fuel contains, the more diffuse its "vaporization plateau" will be.

In step 106, the controller obtains from the monitored heater element temperature the measured heater temperature at a first time $t_1$ at which a slope of the heater temperature as a function of time reaches a predetermined threshold value indicative of fuel boiling (i.e. the "vaporization plateau"). It will be appreciated that the slope of the temperature vs. time characteristic may alternatively be referred to as the time rate of change of the temperature, or as the derivative of the temperature with respect to time. Further, the change in slope of the heater temperature as a function of time may alternatively be referred to as the time rate of change of the slope of the temperature, or as the derivative of the slope of the temperature with respect to time. As described above, the heater temperature increases to the point where boiling first occurs, at which point (first time $t_1$) the slope of the temperature vs. time characteristic undergoes a sharp, sometimes abrupt reduction depending on the ethanol content of the fuel. Depending on the ethanol content, at first time $t_1$ the slope may undergo an inflection where it changes from positive to negative, or for lesser ethanol content (i.e. closer to pure, straight gasoline) there is abrupt decrease in the slope such that the rate of change of the slope undergoes an abrupt negative decrease. In any event, at the beginning of boiling, the slope becomes less than zero, becomes zero, or decreases to a value that is approaching zero such that the slope is less than a predetermined threshold value that is near zero, and the rate of change of the slope is negative, i.e. the slope is decreasing with time. Hence, in step 106 the slope of the temperature vs. time characteristic is compared to a predetermined threshold value which is indicative of fuel boiling, the predetermined threshold value being a positive slope close to but slightly zero, a zero value slope, or even a slope that is less than zero.

At the inception of boiling, latent heat energy is absorbed to allow the fuel to change from liquid phase to vapor phase. While this phase change is subsequently underway, the fuel temperature is essentially constant, at the boiling point of the fuel being vaporized. In step 108, the controller obtains from the monitored heater element temperature the measured heater temperature at a subsequent time $t_2$ at or after which the slope of the heater temperature has approached a value of the slope prior to the change in slope at time $t_1$. The slope of the heater temperature approaching the slope prior to the slope at the first time $t_1$ means that the slope has changed from zero or near zero to a positive value that is close to the prior slope and that is greater than the predetermined threshold value, or that the rate of change of the slope has undergone a positive increase. The point at time $t_2$ corresponds to a point at which all the fuel is vaporized (stabilized film boiling) and there is a resumption in the rise in temperature as shown in FIG. 6. Further, with reference to FIG. 8, an exemplary temperature vs. time heater element curve is illustrated, in which the elapsed time for temperature inflection (slope "break" reference time $t_1$) is indicated by duration A, the temperature at time $t_1$ is at point B, the temperature at subsequent time $t_2$ is at point D, and the elapsed time from the beginning of vaporization until stabilization of vaporization (time between point B and point D) is indicated by duration C. It should be understood that the first time $t_1$ is measured from the time after the heating cycle is initiated and at which an increase in the heating element temperature is observed to the point B at which there is an abrupt change in the slope of the heating element temperature. In other words, the heating element temperature may not begin to rise until some point in time slightly greater than time zero at which the heating cycle began (e.g. a value greater than zero but less than 1 second), and time $t_1$ is the difference between the time at which the temperature at point B is obtained and the time at which the heating element temperature began to increase (which may be zero seconds or a time slight greater than zero seconds). Stated differently, the first time $t_1$ is the duration A which is the elapsed time between the beginning of temperature rise and the temperature "inflection" at point B.

Figure 9:
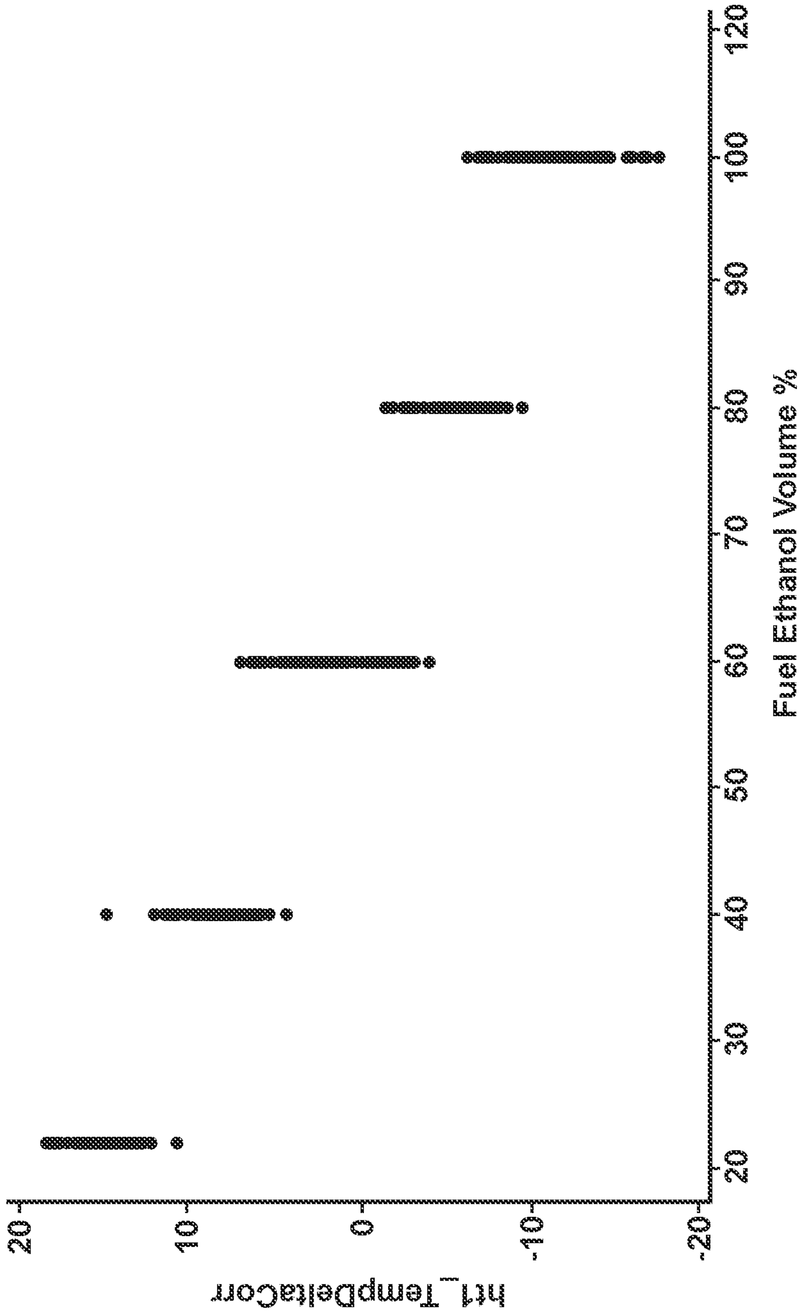
FIG. 9 is a scatterplot of a ΔT at various known fuel ethanol contents.
Figure 10:
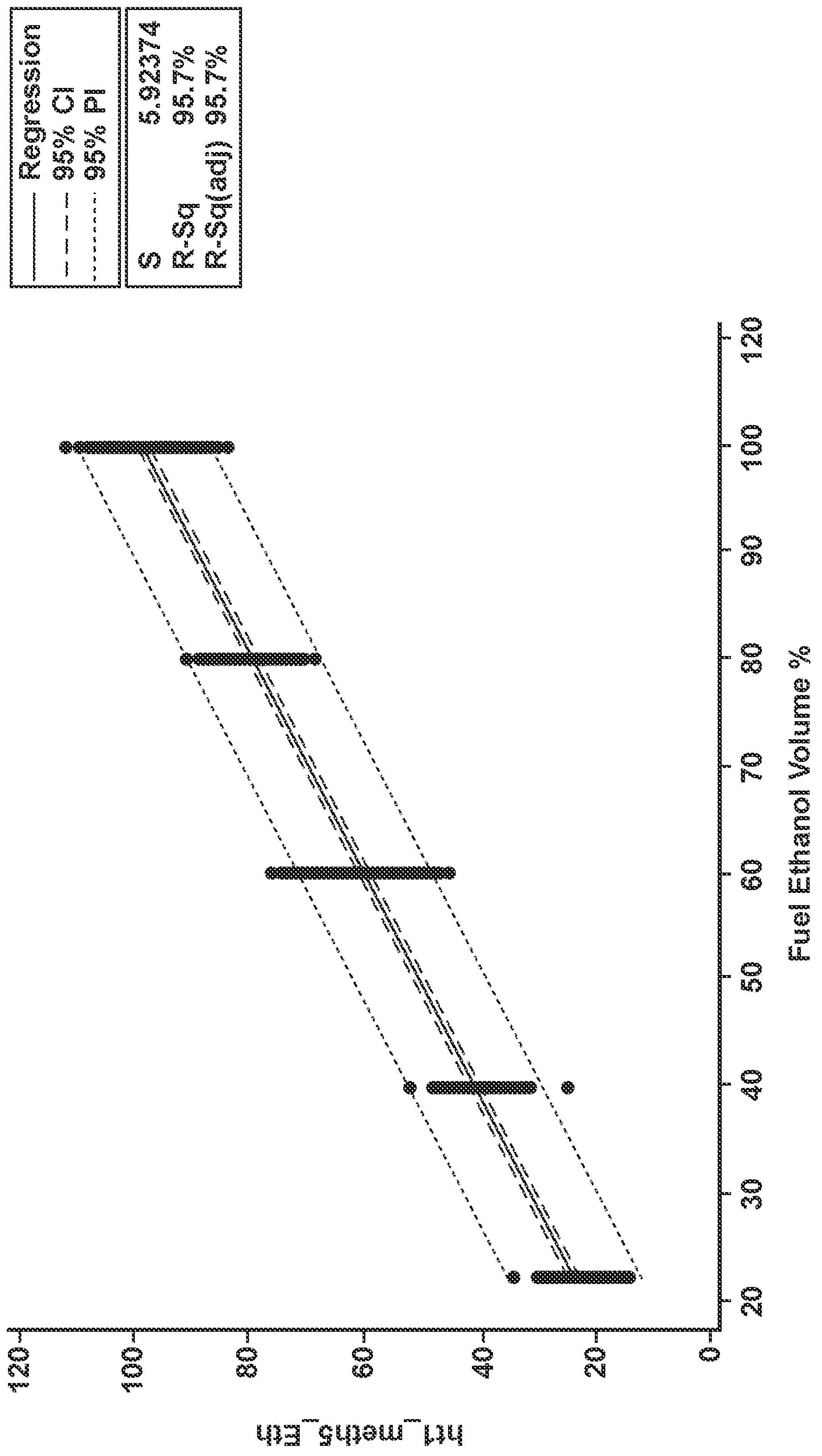
FIG. 10 is a fitted line plot illustrating calculated percentage of ethanol in fuel at various known fuel ethanol contents.
Figure 11:
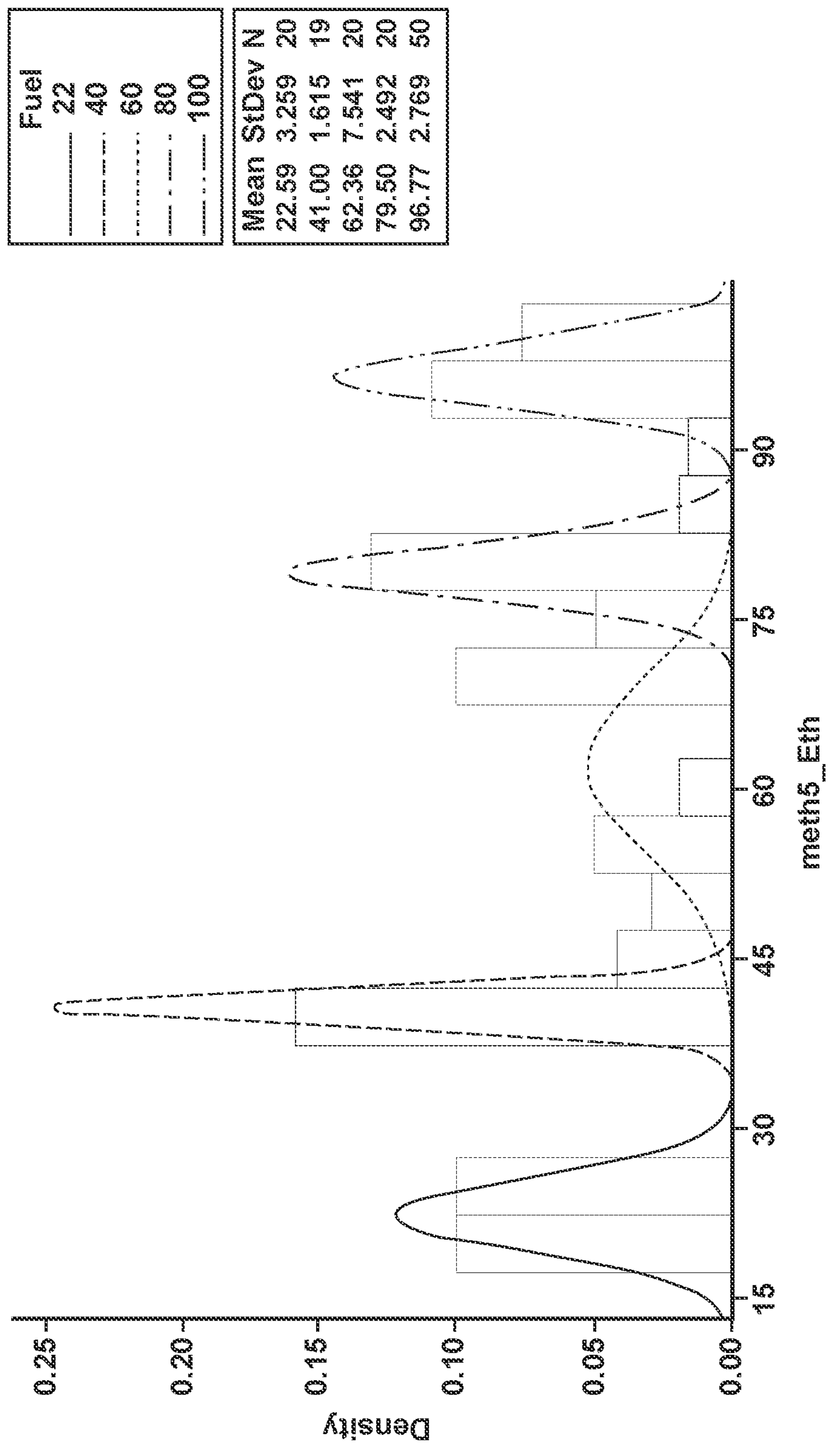
FIG. 11 is a histogram of the calculated percentage of ethanol in fuel at various known fuel ethanol contents.

In step 110, a temperature difference ($\Delta T$) between the obtained heater temperature at time $t_2$ and the obtained heater temperature at the first time $t_1$ is calculated. As shown in FIG. 9, there is a distinct relationship between the ethanol content of fuel (in volume %) and the temperature difference $\Delta T$. Next, in step 112 the percentage of ethanol in the fuel is determined as a function of the calculated temperature difference $\Delta T$ and the first time $t_1$ at which there was a change in slope of the heater temperature. Particularly, the percentage of ethanol is determined by the following equation (I):

$$\%\ \text{Ethanol in fuel}=C+\alpha t_1-\beta(\Delta T)$$

wherein the constant C and coefficients $\alpha$ and $\beta$ are obtained by linear regression of empirical data points obtained from various known ethanol contents such as E100, E60, and E20. A fitted line plot of these data points including confidence interval and population interval boundaries is shown in FIG. 10. A histogram of similar data and the calculated ethanol percent is shown in FIG. 11. As is apparent from the plots, the ethanol percentage determined by the method has a high confidence level within ±15 percentage points of the actual ethanol volume % concentration of the fuel. For example, if the fuel is E60 (actual ethanol content being 60% by volume), the determined ethanol content will be at maximum within the range of approximately 45% to 75%. However, the ethanol content determined by the method may be within a tighter, narrower range. These results are in the same confidence interval as other ethanol learning methods such as those based on data obtained from oxygen sensors. In a specific embodiment, the constant C is 49.95, the coefficient $\alpha$ is 5.22, and the coefficient $\beta$ is 2.8319. However, the numerical values (C, $\alpha$, $\beta$) of the formula may be adjusted based on an empirical linear regression using additional and/or alternative experimental data points obtained from known ethanol concentrations of fuel. In some embodiments, the numerical values may be in a range of ±5% of the stated values, i.e. the constant C may be 49.95±2.50, the coefficient $\alpha$ may be 5.22±0.26, and the coefficient $\beta$ may be 2.8319±0.1416.

It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The invention claimed is:

1. A method of detecting a percentage of ethanol in fuel used by an engine, the method comprising:
  - initiating a heating cycle in a component of a fuel delivery system of the engine, the component including a heater;
  - monitoring the temperature of the heater as a function of time, the heater being operated during the heating cycle;
  - obtaining the heater temperature at a first time $t_1$ at which a slope of the heater temperature as a function of time reaches a predetermined threshold value indicative of fuel boiling;
  - obtaining the heater temperature at a subsequent time $t_2$ at which the slope of the heater temperature approaches a value of the slope prior to the time $t_1$ and which is greater than the predetermined threshold value indicative of fuel boiling;
  - calculating a difference $\Delta T$ between the heater temperature at time $t_2$ and the heater temperature at the first time $t_1$; and
  - determining the percentage of ethanol in the fuel as a function of the calculated temperature difference $\Delta T$ and the first time $t_1$.

2. The method of claim 1, wherein the heating cycle is initiated prior to ignition of the engine.

3. The method of claim 1, wherein the heating cycle is initiated after a refueling event.

4. The method of claim 1, wherein the component is a heated fuel injector.

5. The method of claim 4, wherein the heater heats a body of the heated fuel injector.

6. A method of detecting a percentage of ethanol in fuel used to operate an engine of a flexible fuel vehicle, the method comprising:
  - initiating a heating cycle in a heated fuel injector of the engine, the heated fuel injector including a heater that is operated during the heating cycle;
  - monitoring the temperature of the heater of the heated fuel injector as a function of time;
  - obtaining the heater temperature at a first time $t_1$ at which a slope of the heater temperature as a function of time reaches a predetermined threshold value indicative of fuel boiling;
  - obtaining the heater temperature at a subsequent time $t_2$ at which the slope of the heater temperature approaches a value of the slope prior to the time $t_1$ and which is greater than the predetermined threshold value indicative of fuel boiling;
  - calculating a difference $\Delta T$ between the heater temperature at time $t_2$ and the heater temperature at the first time $t_1$; and
  - determining the percentage of ethanol in the fuel as a function of the calculated temperature difference $\Delta T$ and the first time $t_1$ at which there was a change in slope.

7. The method of claim 6, wherein the heating cycle includes heating a body of the heated fuel injector over a period of time.

8. The method of claim 6, wherein the heating cycle is initiated after adding fuel to a fuel tank of the flexible fuel vehicle.

9. The method of claim 6, wherein the heating cycle is initiated prior to ignition of the engine.

10. The method of claim 6, wherein a duration of the heating cycle is between 5 and 10 seconds.

11. The method of claim 6, wherein the percentage of ethanol is determined by the following equation (1): % ethanol in fuel$=C+\alpha t_1-\beta(\Delta T)$.

12. The method of claim 11, wherein C is 49.95±2.50, $\alpha$ is 5.22±0.26, and $\beta$ is 2.8319±0.1416.

13. The method of claim 11, wherein numerical values of the formula are determined based on an empirical linear regression using experimental data points obtained from known ethanol concentrations of fuel.

14. The method of claim 6, wherein a margin of error of the determined percentage of ethanol in the fuel is ±15%.

15. The method of claim 6, wherein the steps of the method are performed by a fuel heater control module of the flexible fuel vehicle.

16. A fuel delivery system of an engine, the fuel delivery system comprising:
  - a heated fuel injector including a heater and a body that is heated by the heater;
  - a fuel tank that stores fuel;
  - a fuel module that delivers the fuel from the fuel tank to the heated fuel injector; and
  - a fuel heater control module that controls the heater of the heated fuel injector;
  - wherein the fuel heater control module detects a percentage of ethanol in the fuel used to operate the engine by the method of claim 6.

17. A flexible fuel vehicle including:
  - an engine;
  - a fuel delivery system that delivers fuel to the engine;
  - the fuel delivery system including a heated fuel injector including a heater that heats a body; and
  - the fuel delivery system further including a fuel heater control module that controls the heater of the heated fuel injector;
  - wherein the fuel heater control module detects a percentage of ethanol in fuel used to operate the engine by the method of claim 6.

18. A non-transitory computer readable medium storing a program that causes a controller to execute a method of detecting a percentage of ethanol in fuel used to operate an engine of a flexible fuel vehicle, the method comprising the steps of:
  - initiating a heating cycle in a heated fuel injector of the engine, the heated fuel injector including a heater that is operated during the heating cycle;
  - monitoring the temperature of the heater of the heated fuel injector as a function of time;
  - obtaining the heater temperature at a first time $t_1$ at which a slope of the heater temperature as a function of time reaches a predetermined threshold value indicative of fuel boiling;
  - obtaining the heater temperature at a subsequent time $t_2$ at which the slope of the heater temperature approaches a value of the slope prior to the time $t_1$ and which is greater than the predetermined threshold value indicative of fuel boiling;
  - calculating a difference $\Delta T$ between the heater temperature at time $t_2$ and the heater temperature at the first time $t_1$; and
  - determining the percentage of ethanol in the fuel as a function of the calculated temperature difference $\Delta T$ and the first time $t_1$ at which there was a change in slope.

* * * * *